(12) United States Patent
Oberdorfer (10) Patent No.: US 7,454,749 B2
(45) Date of Patent: Nov. 18, 2008

(54) SCALABLE PARALLEL PROCESSING ON SHARED MEMORY COMPUTERS

(75) Inventor: Matthias Oberdorfer, Fort Collins, CO (US)

(73) Assignee: Engineered Intelligence Corporation, Mountain View, CA (US)

( * ) Notice: Subject to any disclaimer, the term of this patent is extended or adjusted under 35 U.S.C. 154(b) by 584 days.

(21) Appl. No.: 10/293,791

(22) Filed: Nov. 12, 2002

(65) Prior Publication Data

US 2004/0093477 A1 May 13, 2004

(51) Int. Cl.
*G06F 9/455* (2006.01)
(52) U.S. Cl. .............................. 718/1; 718/100; 712/22
(58) Field of Classification Search .................. 718/1, 718/100–108; 712/22
See application file for complete search history.

(56) References Cited

U.S. PATENT DOCUMENTS

| | | | | |
|---|---|---|---|---|
| 4,156,907 | A | 5/1979 | Rawlings et al. | |
| 4,809,169 | A * | 2/1989 | Sfarti et al. | 712/20 |
| 4,827,403 | A * | 5/1989 | Steele et al. | 712/13 |
| 4,888,726 | A | 12/1989 | Struger et al. | |
| 5,381,534 | A * | 1/1995 | Shi | 709/203 |
| 5,418,970 | A * | 5/1995 | Gifford | 712/20 |
| 5,805,915 | A * | 9/1998 | Wilkinson et al. | 712/20 |
| 5,829,052 | A | 10/1998 | Pawlowski et al. | |
| 6,718,361 | B1 | 4/2004 | Basani et al. | |
| 6,886,031 | B2 | 4/2005 | Venkatsubramanian et al. | |
| 2003/0154284 | A1* | 8/2003 | Bernardin et al. | 709/226 |

* cited by examiner

*Primary Examiner*—Thomas Lee
*Assistant Examiner*—Jaweed A Abbaszadeh
(74) *Attorney, Agent, or Firm*—William W. Cochran; Cochran Freund & Young LLC (57) ABSTRACT

A virtual parallel computer is created within a programming environment comprising both shared memory and distributed memory architectures. At run time, the virtual architecture is mapped to a physical hardware architecture. In this manner, a massively parallel computing program may be developed and tested on a first architecture and run on a second architecture without reprogramming.

21 Claims, 7 Drawing Sheets

200
Editor Process

400
Virtual Parallel
Processing
Computer

SCALABLE PARALLEL PROCESSING ON SHARED MEMORY COMPUTERS

CROSS REFERENCE TO RELATED APPLICATIONS

The present application is filed simultaneously with application Ser. No. 10/293,792 entitled "Connected Memory Management" by the present inventor, Matthias Oberdorfer, filed 12 Nov. 2002, the full text of which is hereby specifically incorporated by reference for all it discloses and teaches.

BACKGROUND OF THE INVENTION a. Field of the Invention

The present invention pertains to parallel processing computers and specifically to processing on clusters of computers.

b. Description of the Background

Parallel processing on multiple computers has been a challenging and complex task that has always required a high degree of custom software. In many cases, software must be created for a specific physical configuration of computers or processors.

Many types of parallel computing are known in the art. Shared memory computing has several processors that have memory that is directly accessible by all of the processors. Such computers have the ability to synchronously execute the same or similar instructions on an array of data.

Parallel computing may be performed by separate computers that are connected over a network, sometimes known as cluster computers. The computers may communicate by passing messages between the computers. In such message passing parallel computing, the individual programs that are operating on the various computers must be synchronized at least in part so that the messages may be transmitted, acknowledged, and replied.

Other types of multi-processor computing systems are known in the art. However, each of the systems requires that the software is tailored to the specific system. For example, if a program were written for a shared memory computer, the same program would have to be rewritten to operate on a message passing computer system. In some cases, a program for a cluster computer of ten nodes may have to be changed in order to operate on a cluster computer of one thousand nodes.

It would be advantageous to provide a computing platform wherein the advantages of shared memory systems and message passing systems are both realized. It would be further advantageous if the system were automatically scalable to different computing architectures and thus programs could be developed and tested in a small computing environment prior to running on a large scale cluster computer or the like.

SUMMARY OF THE INVENTION

The present invention overcomes the disadvantages and limitations of the prior art by providing a system and method for creating a parallel computer program that is mapped to the available computer architecture at run time. Further, programming techniques of the shared memory architecture as well as those of the message passing architecture may be utilized where practical without regard to the topology of the hardware.

The present invention may therefore comprise a method of parallel processing on a computer array comprising the steps of: creating a virtual parallel processing computer system comprising a plurality of parallel processing units; creating programs for each of said parallel processing units wherein each of said programs performs a predetermined function on predetermined data; determining the topology of the physical hardware configuration on which said virtual parallel processing computer system will execute said programs, said topology having at least one computing node; allocating at least one of said parallel processing units to at least one of said computing nodes based upon a distribution algorithm; transferring said programs and said data to said computing nodes for each of said parallel processing units; and executing said programs for said parallel processing units on said computing nodes.

The present invention may further comprise a computer programming environment for parallel computing comprising: an editor adapted to create a virtual parallel processing computer system comprising a plurality of parallel processing units, said editor further adapted to create programs for each of said parallel processing units wherein each of said programs performs a predetermined function on predetermined data; a virtual computer loader routine adapted to determine the topology of the physical hardware configuration on which said virtual parallel processing computer system will execute said programs, said topology having at least one computing node, said loader routine further adapted to allocate at least one of said parallel processing units to at least one of said computing nodes based upon a distribution algorithm and transfer said programs and said data to said nodes for each of said parallel processing units; and a virtual computer execution routine adapted to execute said programs for said parallel processing units.

The present invention may further comprise a parallel processing computer system comprising: at least one computing node comprising at least one processor, said computing node connected to a network; an editing system adapted to create a virtual parallel processing computer system comprising a plurality of parallel processing units, said editor further adapted to create programs for each of said parallel processing units wherein each of said programs performs a predetermined function on predetermined data; and a system controller computer comprising a virtual computer loader routine adapted to determine the topology of the physical hardware configuration on which said virtual parallel processing computer will execute said programs, said topology comprising said at least one computing node, said loader routine further adapted to allocate at least one of said parallel processing units to at least one of said computing nodes based upon a distribution algorithm and transfer said programs and said data to said nodes for each of said parallel processing units, and a virtual computer execution routine adapted to execute at least two of said programs for said parallel processing units substantially simultaneously.

The advantages of the present invention are that programming tasks that are applicable to the techniques of shared memory or message passing parallel processing may be combined in a single application. Further, the application may be created and run on any parallel processing architecture without reprogramming.

Unlike the message passing technique this invention provides a method that does not utilize a sender receiver method but utilizes a memory access method that allows read/write capability by a virtual processor into another's virtual processors memory. This method provides accessing the memory directly from each virtual node to each virtual other node.

DETAILED DESCRIPTION OF THE INVENTION

Figure 1:
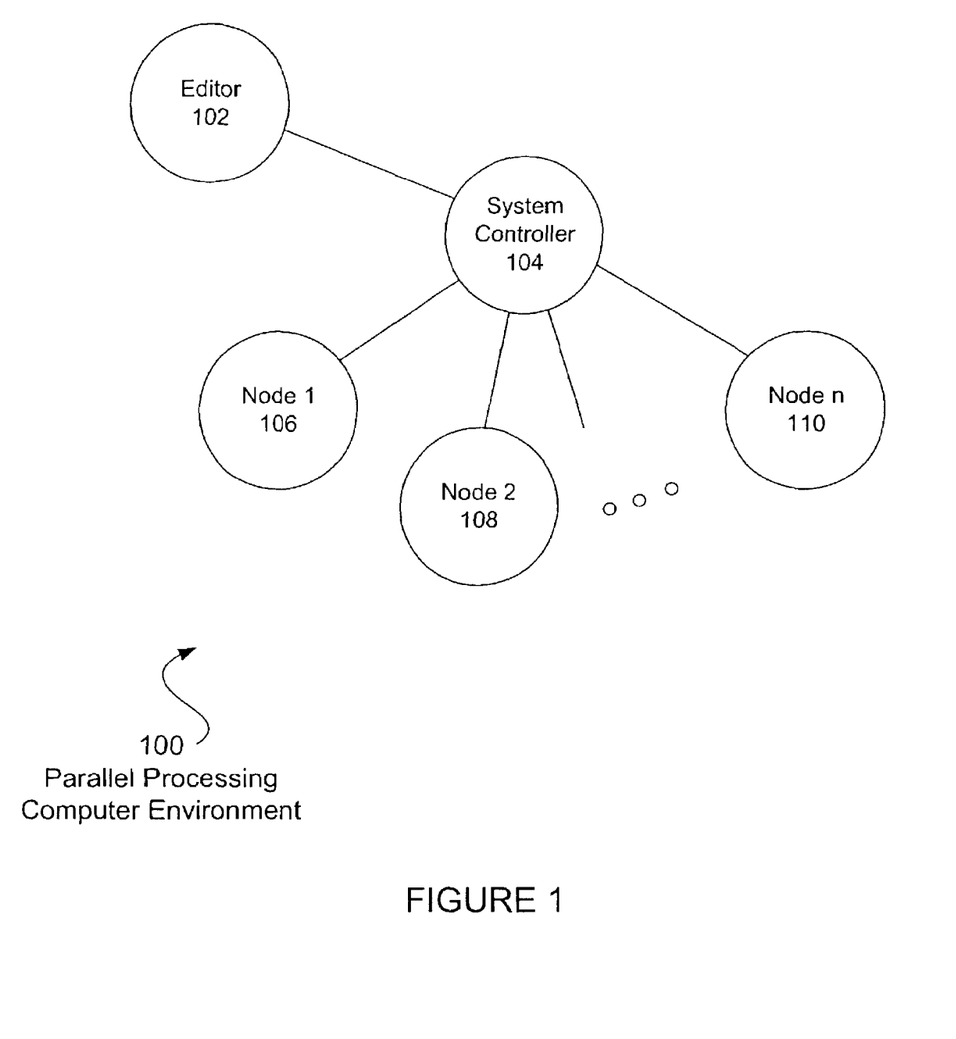
FIG. 1 is an illustration of an embodiment of the present invention of a parallel processing computer system.

FIG. 1 illustrates an embodiment of the present invention of a parallel processing computer system 100. An editor 102 is connected to a system controller 104 that is in turn connected to compute nodes 106, 108, and 110.

The editor 102, controller 104, and nodes 106, 108, and 110 may be separate computers or a single computer. In some embodiments, especially those directed at solving large computational tasks, the number of computational nodes may be on the order of hundreds or even thousands of computers. The various computers may be connected by a standard network interface or may be connected through a high-speed proprietary interface. In some embodiments, the nodes may comprise multiple processors. In other embodiments, the editor 102, controller 104, and node 106 may be a single processor computer. With such an embodiment, the development of computer code may be performed without requiring a large cluster of computers for development purposes.

Figure 2:
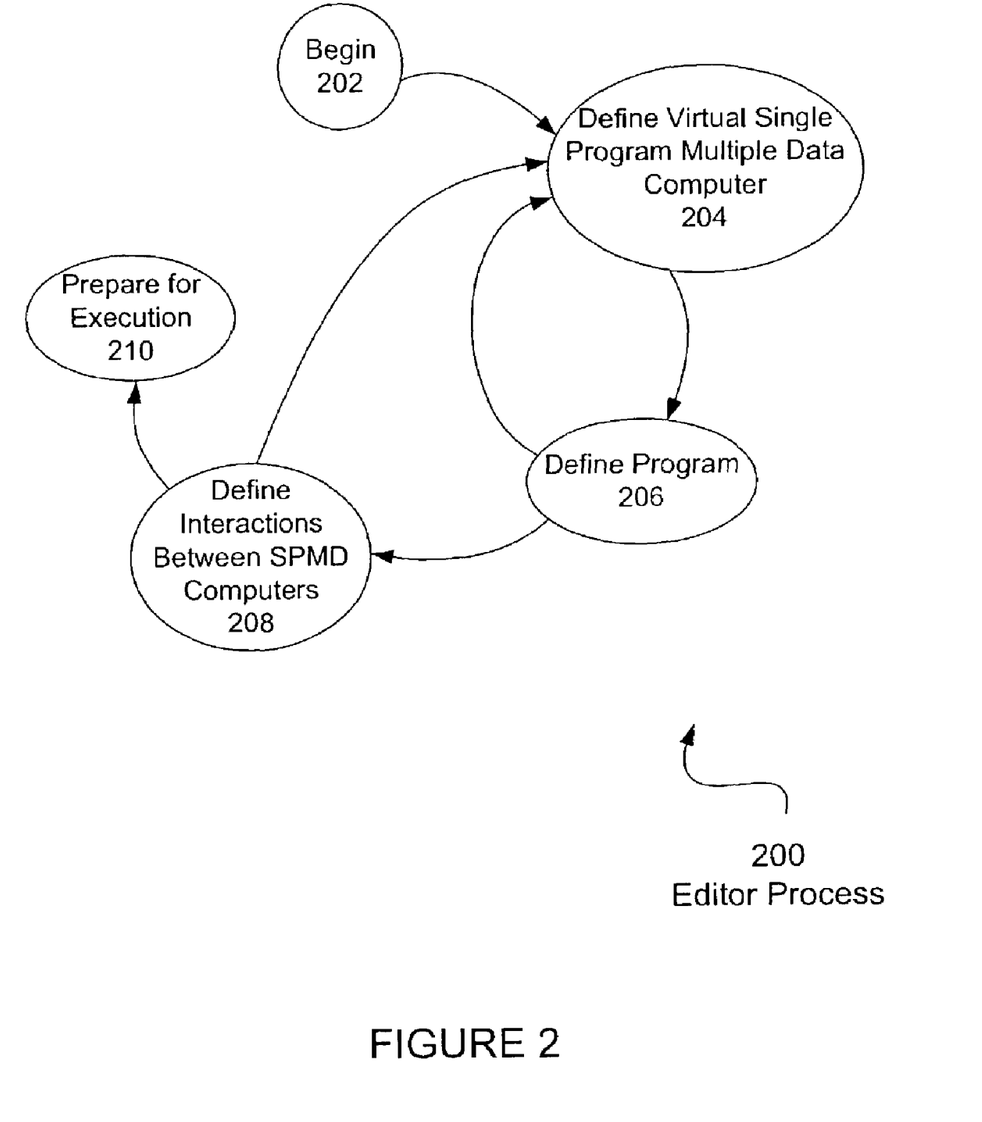
FIG. 2 is an illustration of a workflow diagram of an embodiment of the present invention of an editor process for the creation of a virtual processor computer.

FIG. 2 illustrates a workflow diagram of an embodiment 200 of an editor process for the creation of a virtual parallel processor computer. The process is begun in block 202 and a virtual single process multiple data (SPMD) computer is defined in block 204. A program to be executed by the SPMD computer is defined in block 206. The process may be repeated to define several SPMD computers. The interaction between SPMD computers may be defined in block 208. When all SPMD computers are defined, the virtual parallel processor computer is prepared for execution in block 210.

Figure 3:
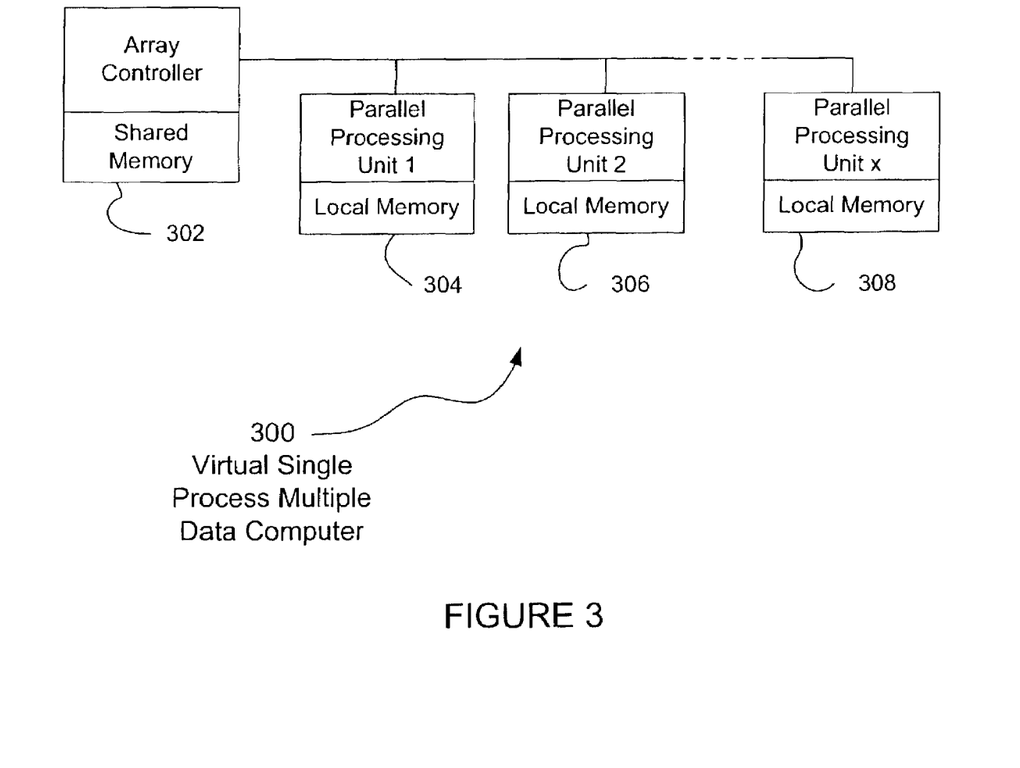
FIG. 3 is an illustration of an embodiment of the present invention of a virtual single process multiple data computer.

FIG 3 illustrates an embodiment 300 of a virtual single process multiple data (SPMD) computer. An arry controller 302 containing shared memory is connected to parallel processing units (PPU) 304, 306, and 308, each having local memory. Such processing schemes are suitable for the simultaneous calculations on large arrays of data among other tasks. In general, each PPU would run an identical program and operate on a different element of an array of data. For example, if an array of 1000 elements were to be analyzed, an embodiment of a virtual SPMD computer may contain one program operating on 1000 PPU's. Each would have in its local memory a single element of the array.

Figure 3A:
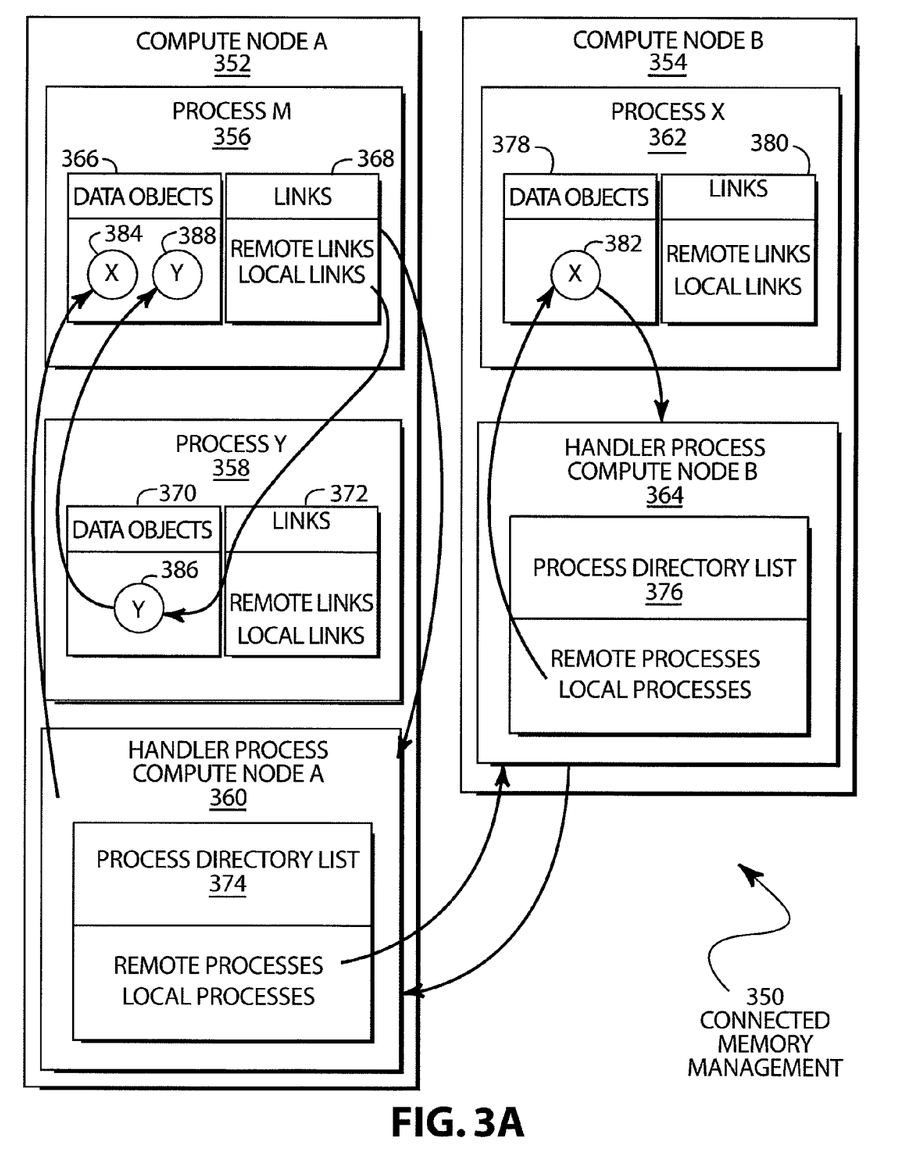
FIG. 3a illustrates an embodiment of the present invention wherein two compute nodes 352 and 354 interact. Compute node 352 has Process M 356 and Process Y 358 performing computational tasks while Handler Process 360 is also running. Compute node 354 has Process X 362 and a Handler Process 364.

The PPU's 304, 306, and 308 may also interact in the manner described in the co-pending U.S. application Ser. No. 10/293,792 entitled "Connected Memory Management" assigned to the assignee of the instant application and incorporated herein by reference. FIG. 3a illustrates an embodiment of the present invention wherein two compute nodes 352 and 354 interact. The nodes 352 or 354 may exist on the array controller 302 or either of the PPU's 304, 306, and 308. Compute node 352 has Process M 356 and Process Y 358 performing computational tasks while Handler Process 360 is also running. Compute node 354 has Process X 362 and a Handler Process 364.

Process M 356 has a data store 366 comprising data objects, and a link table 368 comprising links to all of the data objects that are needed by Process M 356. Correspondingly, Process Y 358 has data store 360 and link table 372 as Process X 362 has data store 378 and link table 380. The Handler Process 360 has process directory list 374 and Handler Process 364 has process directory list 376.

For example, Process M 356 may request updates to two data objects, X 384 and Y 388. The link table 368 may indicate that object X is stored on a remote process, so a request is sent to Handler Process 360. The Handler Process consults the process directory list 374 and forwards the request to the Handler Process 364, which consults the process directory list 376 to determine that the requested object is stored on the local compute node 354. The Handler Process 364 retrieves the data object X 382 directly from the data store 378 without disturbing the ongoing computational Process X 362. The Handler Process 364 sends the data object to Handler Process 360, which places the updated data object X 384 in the data store 386 of computational process 356.

In order to update data object Y 388, Process M 356 consults the link table 368 to determine that the data object is located locally, in Process Y 358. The Process M 356 is then able to directly access data object Y 386 from the data store 370 and transfer the data object Y 386 to the data store 366.

In the above example, the various computational processes are able to continue processing without having to service requests from other processes. Those processes that are running on the same compute node, such as Process M 356 and Process Y 358, are able to directly access the data store associated with the other process. In this fashion, the present embodiment operates with equivalent speed and benefits of a shared memory multiprocessor system.

In the case where a data object is located on a remote compute node, the Handler Processes 360 and 364 are able to efficiently communicate and access the necessary data without having to disturb the ongoing computational processes. While such transactions are not as streamlined and fast as a traditional shared memory system, many more nodes are able to be connected to each other. Further, the individual computational nodes may be different computers from different vendors and may have different operating systems.

In some embodiments, a compute node may have multiple processors. In such cases, one of the processors may handle operating system tasks as well as the handler process while the remaining processor or processors may strictly perform computational processes. In such an embodiment, the computational processes may operate at full speed on the separate processors while having the overhead functions, including the handler process, handled by the first processor. Those skilled in the art will appreciate that the present invention is not constrained to either multiprocessor or single processor computational nodes.

Thus, this process of "connected memory management" is uniquely adaptable to parallel processing on shared memory computers configured in a virtual parallel computer system because the data handler process can be sent to all connected computers that would allow all the connected computers to access the various connected memories directly for additional speed in the computing processes. Each computer connected to the system could access the shared memory file of the array controller 302 as well as directly access the memories of other connected computers.

Tasks that are adaptable and suitable for classical shared memory parallel processing computer systems may be developed for the virtual SPMD computers. In a conventional prior art shared memory computer, one parallel processing unit would correspond to exactly one processor of the multiprocessor computer.

Figure 4:
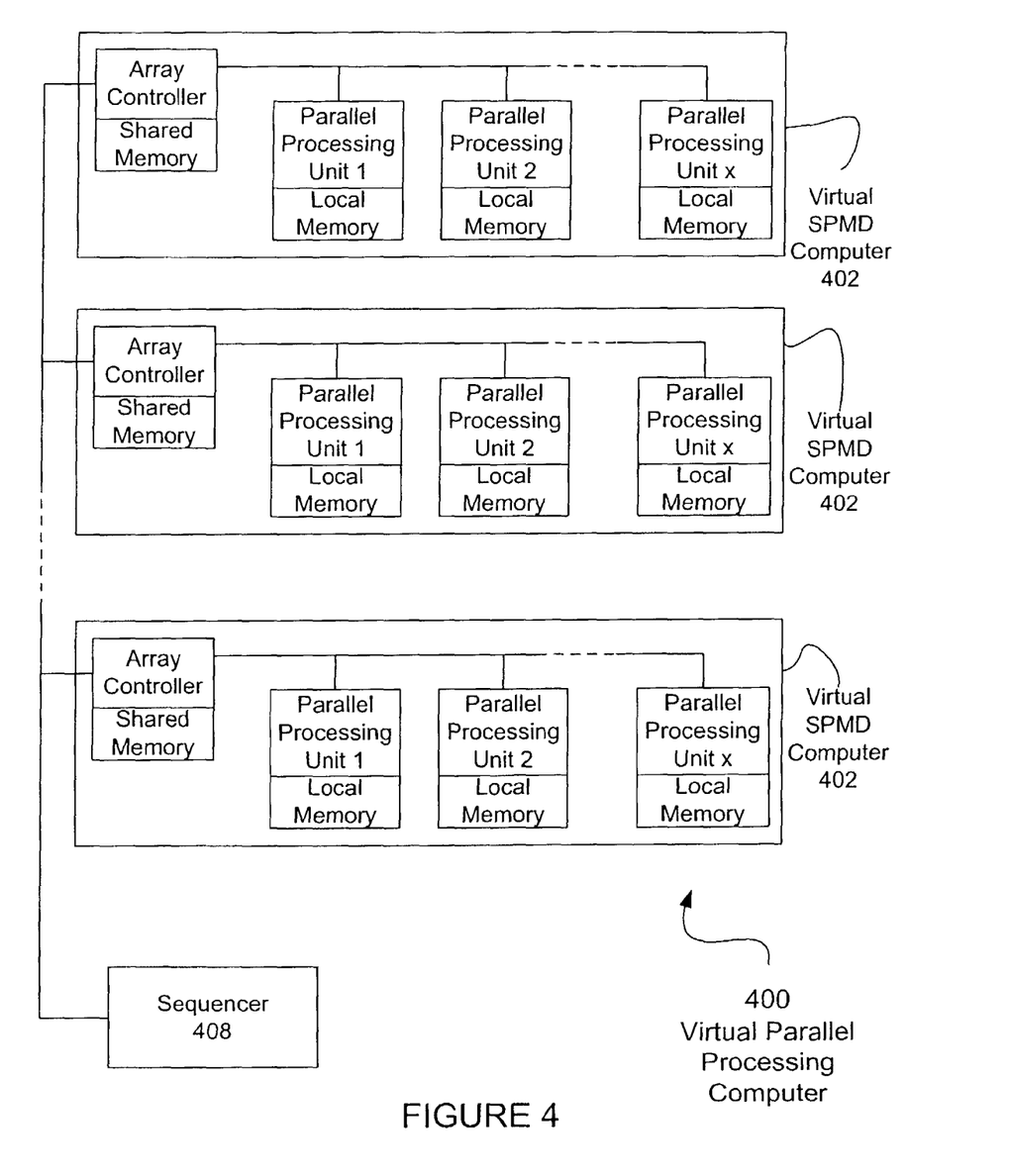
FIG. 4 is an illustration of an embodiment of the present invention of a virtual parallel processing computer wherein multiple single process multiple data computers are connected.

FIG. 4 illustrates an embodiment 400 of a virtual parallel processing computer wherein multiple single process multiple data computers are connected. A plurality of SPMD computers 402, 404, and 406 are connected to each other and a sequencer 408. The sequencer 408 may have the ability to coordinate tasks between the various SPMD computers.

The connection of multiple virtual computers allows a programmer to use known programming techniques suitable to message passing parallel computers. In some cases, a programmer may elect to create multiple SPMD computers each running a single process and handle the synchronization between the various computers using similar programming techniques as message passing parallel computing.

Figure 5:
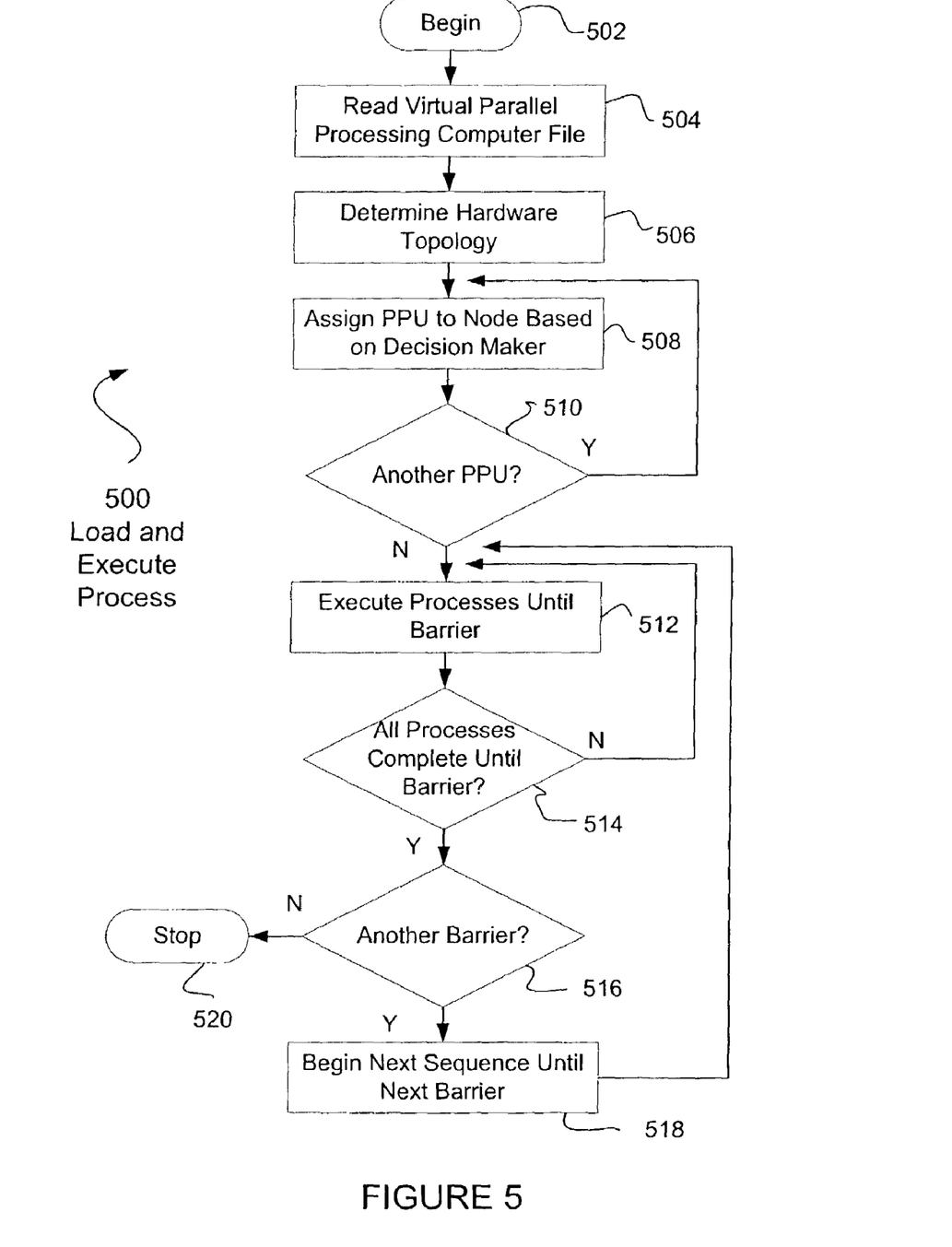
FIG. 5 is an illustration of an embodiment of the present invention of a load and execute process that takes a virtual parallel computer and loads the various processes to a physical hardware topology.

FIG. 5 illustrates an embodiment 500 of a load and execute process that takes a virtual parallel computer and loads the various processes to a physical hardware topology. The process is begun in block 502 and the virtual parallel computer file is read in block 504. The actual hardware topology is determined in block 506. A parallel processing unit is assigned to a physical node based on a decision maker in block 508. If there are more unassigned PPU's, block 508 is repeated. When all of the PPU's are assigned to the various nodes, the execution of a process continues until a barrier statement is reached in block 512. If there are unfinished or unexecuted processes in block 514, the remaining processes are executed in block 512. When the processes are complete to the barrier in block 514, and the barrier statement is not the last barrier statement in block 516, the processes are started again until the next barrier in block 518. If the last barrier is reached in block 516, the process is stopped in block 520.

The hardware topology in block 506 may be determined by several different methods. In one embodiment, the hardware topology may be manually entered. In other embodiments, an automated program may analyze the available hardware to determine availability. In still other embodiments, the available hardware may be benchmarked to determine computational speed.

The embodiment 500 illustrates a method of loading the virtual parallel process computer onto a hardware topology. Each of the many parallel processing units are assigned to be run on physical hardware based on the decision maker in block 508. In some cases with high number of parallel processing units, many PPU's may be assigned to a single computer node and executed. In such a case, each PPU may be calculated until a barrier statement is reached, then another PPU may be calculated until the same barrier and so forth until all of the PPU's are brought up to the same stage of processing. In other embodiments containing a large number of nodes, a single PPU may be assigned to a single computational node and the overall process may execute more quickly.

The decision maker used to determine the assignment of a PPU to a hardware node in block 508 may have many different types of algorithms. In a simple example, the PPU's may be assigned to computational nodes in order until all of the PPU's are assigned to nodes. In other cases, PPU's with common data may be assigned to a single node to minimize performance degradation due to transferring data. In still other cases, the computational time requirements of a PPU may be estimated and the PPU's may be dispersed among the available computational nodes to maximize the utility of the nodes. Such estimations may be used with a benchmark program of the available hardware to maximize the efficiency of the entire computer cluster. Those skilled in the arts may develop complex algorithms for determining the optimum placement of PPU's among the available hardware nodes.

The processes are executed until a barrier statement is reached. A barrier statement is a coordination or synchronization step that is traversed when all of the parallel processes have been brought up to the same point. In some cases, a barrier statement may be for the processes within a specific virtual SPMD computer. In other cases, the barrier statement may be global and require that all processes to be brought to a specific point, regardless of the SPMD to which they belong.

Figure 6:
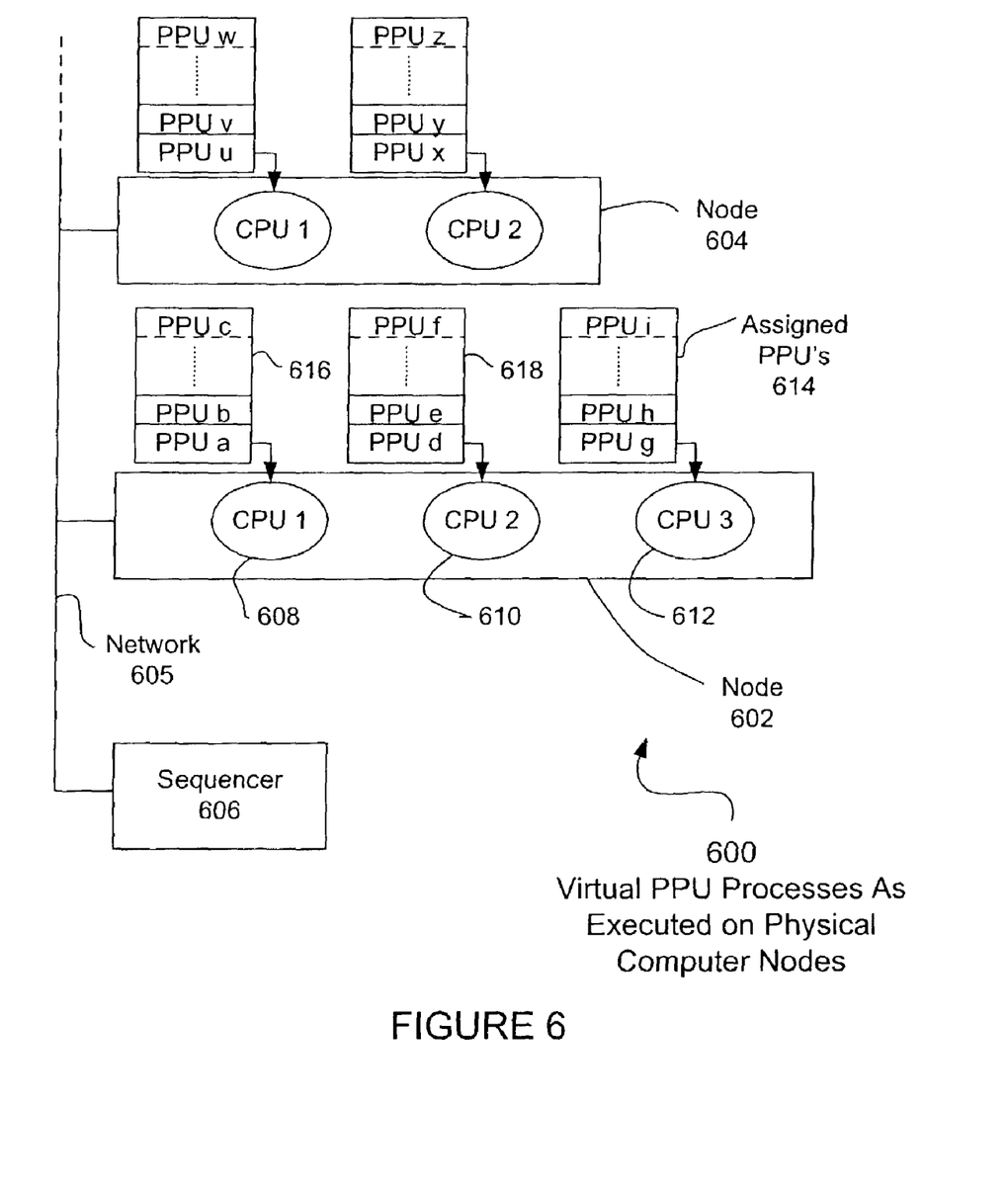
FIG. 6 is an illustration of an embodiment of the present invention wherein virtual parallel processing units are mapped onto a physical hardware topology.

FIG. 6 illustrates an embodiment 600 of the present invention wherein virtual PPU processes are mapped onto a physical hardware topology. Nodes 602 and 604 are connected by a network 605 to a sequencer 606. The node 602 has three CPU's 608, 610, and 612. The CPU 612 has a stack of PPU's 614 assigned to it.

The CPU 612 may execute one PPU at a time until a barrier statement is reached. If more PPU's within the stack need processing in order to reach the barrier, they may be executed. When all of the PPU's have reached the barrier, the CPU 612 or the node 602 may indicate to the sequencer 606 that the barrier has been reached. When all of the PPU's have been executed to the barrier, the sequencer 606 may send an instruction to begin execution of the PPU's until the next barrier and so forth.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of parallel processing on a computer array comprising the steps of:

creating a virtual single process multiple data computer system comprising an array controller and a plurality of parallel processing units, said array controller having a shared memory and each of said parallel processing units having a dedicated local memory;

creating programs for each of said parallel processing units wherein each of said programs performs a predetermined function on predetermined data stored on said dedicated memory of each parallel processing unit and each of said programs shares data directly with other programs of said programs using a shared memory architecture such that said array controller and said parallel processing units operate virtually as a single process multiple data computer;

determining a topology of a physical hardware configuration on which said virtual single process multiple data computer system will execute said programs, said topology having at least one computing node;

allocating at least one of said parallel processing units to at least one of said computing nodes based upon a distribution algorithm;

transferring said programs and said data to said computing nodes for each of said parallel processing units; and executing said programs for said parallel processing units on said computing nodes.

2. The method of claim 1 wherein said virtual single process multiple data computer system comprises at least one single program multiple data virtual computer.

3. The method of claim 2 wherein said virtual single process multiple data computer system contains a plurality of single program multiple data virtual computers.

4. The method of claim 1 wherein said distribution algorithm comprises estimating an amount of time required for each of said parallel processing units to process said programs.

5. The method of claim 1 wherein said programs include at least one barrier statement wherein all of said programs are executed until one of said barrier statements is reached before processing continues on any of said programs past said barrier statement.

6. The method of claim 1 further comprising:

creating a virtual parallel processing computer system comprising a plurality of virtual single process multiple data computer systems and a sequencer, each of said plurality of virtual single process multiple data computer systems being an instance of said virtual single process multiple data computer system;

coordinating tasks between said plurality of virtual single process multiple data computers with said sequencer; and passing data between said plurality of virtual single process multiple data computers using a message passing architecture.

7. A computer programming environment for parallel computing comprising:

at least one computer arranged in a hardware topology to create said computer programming environment, said at least one computer performing various processes of said computer programming environment;

an array controller having a shared memory;

a plurality of parallel processing units, each of said parallel processing units having a dedicated local memory;

an editor process that creates a virtual single process multiple data computer system comprising said array controller and said a plurality of parallel processing units, said editor further creates programs for each of said parallel processing units wherein each of said programs performs a predetermined function on predetermined data stored on said dedicated memory of each parallel processing unit and each of said programs shares data directly with other programs of said programs using a shared memory architecture such that said array controller and said parallel processing units operate virtually as a single process multiple data computer;

a virtual computer loader sub-process that determines a topology of a physical hardware configuration on which said virtual single process multiple data computer system will execute said programs, said topology having at least one computing node, said loader sub-process further allocates at least one of said parallel processing units to at least one of said computing nodes based upon a distribution algorithm and transfer said programs and said data to said nodes for each of said parallel processing units; and a virtual computer execution process that executes said programs for said parallel processing units.

8. The computer programming system system of claim 7 wherein said virtual single process multiple data computer system comprises at least one single program multiple data virtual computer.

9. The computer programming system of claim 8 wherein said virtual single process multiple data computer system contains a plurality of single program multiple data virtual computers.

10. The computer programming system of claim 7 wherein said distribution algorithm comprises estimating an amount of time required for each of said parallel processing units to process said programs.

11. The computer programming system of claim 7 wherein said programs include at least one barrier statement, wherein all of said programs are executed until one of said barrier statements is reached before processing continues on any of said programs past said barrier statement.

12. The computer programming system environment of claim 7 further comprising:

a supplementary editor system that creates a virtual parallel processing computer system comprising a plurality of virtual single process multiple data computer systems and a sequencer, each of said plurality of virtual single process multiple data computer systems being an instance of said virtual single process multiple data computer system;

a sequencer that coordinates tasks between said plurality of virtual single process multiple data computers; and a message passing system that passes data between said plurality of virtual single process multiple data computers using a message passing architecture.

13. A parallel processing computer system comprising:

at least one computing node comprising at least one processor, said computing node connected to a network;

an editing system that creates a virtual single process multiple data computer system comprising an array controller and a plurality of parallel processing units, said array controller having a shared memory and each of said parallel processing units having a dedicated local memory, said editor further creates programs for each of said parallel processing units wherein each of said programs performs a predetermined function on predetermined data stored on said dedicated memory of each parallel processing unit and each of said programs shares data directly with other programs of said programs using a shared memory architecture such that said array controller and said parallel processing units operate virtually as a single process multiple data computer; and a system controller computer comprising a virtual computer loader routine that determines a topology of a physical hardware configuration on which said virtual single process multiple data computer will execute said programs, said topology comprising said at least one computing node, said loader routine further allocates at least one of said parallel processing units to at least one of said computing nodes based upon a distribution algorithm and transfer said programs and said data to said nodes for each of said parallel processing units, and a virtual computer execution routine that executes at least two of said programs for said parallel processing units substantially simultaneously.

14. The parallel processing computer system of claim 13 wherein said compute node, said editing system, and said system controller computer are the same computer.

15. The parallel processing computer system of claim 13 further comprising a plurality of compute nodes.

16. The parallel processing computer system of claim 15 wherein at least one of said compute nodes comprises a plurality of processors.

17. The parallel processing computer system of claim 13 wherein said virtual parallel single process multiple data system comprises at least one single program multiple data virtual computer.

18. The parallel processing computer system of claim 17 wherein said virtual single process multiple data computer system contains a plurality of single program multiple data virtual computers.

19. The parallel processing computer system of claim 13 wherein said distribution algorithm comprises estimating an amount of time required for each of said parallel processing units to process said programs.

20. The parallel processing computer system of claim 13 wherein said programs include at least one barrier statement, wherein all of said programs are executed until one of said barrier statements is reached before processing continues on any of said programs past said barrier statement.

21. The parallel processing computer system of claim 13 further comprising:
    a supplementary editor system that creates a virtual parallel processing computer system comprising a plurality of virtual single process multiple data computer systems and a sequencer, each of said plurality of virtual single process multiple data computer systems being an instance of said virtual single process multiple data computer system;
    a sequencer that coordinates tasks between said plurality of virtual single process multiple data computers; and
    a message passing system that passes data between said plurality of virtual single process multiple data computers using a message passing architecture.

* * * * *